(12) United States Patent
Kraetz et al.

(10) Patent No.: US 8,666,694 B2
(45) Date of Patent: Mar. 4, 2014

(54) ESTIMATION OF AN INITIAL CONDITION INERTIAL REFERENCE FRAME

(75) Inventors: William Francis Kraetz, Scottsdale, AZ (US); Drew A. Karnick, Blaine, MN (US)

(73) Assignee: Honeywell International Inc., Morristown, NJ (US)

( * ) Notice: Subject to any disclaimer, the term of this patent is extended or adjusted under 35 U.S.C. 154(b) by 353 days.

(21) Appl. No.: 13/208,929

(22) Filed: Aug. 12, 2011

(65) Prior Publication Data

US 2013/0041618 A1    Feb. 14, 2013

(51) Int. Cl.
*G01P 15/00*  (2006.01)
*G01C 9/10*  (2006.01)
*G01C 19/00*  (2013.01)
*G01C 21/16*  (2006.01)

(52) U.S. Cl.
CPC ............... *G01C 19/00* (2013.01); *G01C 21/16* (2013.01)
USPC ............................... 702/141; 701/4; 702/150

(58) Field of Classification Search
CPC ................................ G01C 19/00; G01C 21/16
USPC .................. 702/127, 141, 150; 701/4, 5, 472; 244/3.11, 164
See application file for complete search history.

(56) References Cited

U.S. PATENT DOCUMENTS

| 6,068,217 A | 5/2000 | Stoen |
| 6,721,657 B2 | 4/2004 | Ford |
| 6,845,938 B2 | 1/2005 | Muravez |
| 7,835,826 B1 * | 11/2010 | Weigl et al. .................. 701/4 |
| 2004/0030464 A1 | 2/2004 | Buchler |
| 2004/0150557 A1 | 8/2004 | Ford |
| 2007/0219744 A1 * | 9/2007 | Kolen .......................... 702/150 |
| 2008/0140315 A1 | 6/2008 | Krogh |

OTHER PUBLICATIONS

Chawla, "Initial State Estimation for a Gun Launched Projectile in a Spatially Varying Magnetic Field", Jun. 13, 2006, pp. i-53.
Karsenti, "A Study of IMU Alignment Transfer", Feb. 1989, pp. 1-181.

* cited by examiner

*Primary Examiner* — John H Le
(74) *Attorney, Agent, or Firm* — Fogg & Powers LLC

(57) ABSTRACT

An inertial device for determining an initial condition reference frame for a body is provided. The inertial device includes at least one inertial measurement unit, one or more processing devices, and one or more memory devices. The inertial measurement unit provides rotation information along at least one axis to the one or more processing devices. The one or more processing devices use the rotation information to estimate the current attitude of the body, based on estimates of a total rotation angle experienced by the body from the beginning of body motion to when the inertial measurement unit initialized.

20 Claims, 5 Drawing Sheets

——— Ideal Weapon Response
--- Inertial Model

ESTIMATION OF AN INITIAL CONDITION INERTIAL REFERENCE FRAME

BACKGROUND

Some of today's current weapons systems, like the Paveway III, use dual axis spinning mass gyros to establish an inertial coordinate frame after weapon release from an aircraft. The Humphrey gyroscope found in the Paveway III has a 100 ms start time. A rapid start time allows for quick establishment of a local vertical after the weapon is released and begins to roll. Keeping track of this rolling motion can be important to determining the orientation and attitude of the weapon.

SUMMARY

In one embodiment, an inertial device for determining an initial condition reference frame for a body is provided. The inertial device comprises at least one inertial measurement unit, one or more processing devices, and one or more memory devices. The inertial measurement unit provides rotation information along at least one axis to the one or more processing devices. The one or more processing devices uses the rotation information to estimate the current attitude of the body, based on estimates of a total rotation angle from experienced by the body from the beginning of body motion to when the inertial measurement unit initialized.

DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings in which.

Figure 4A:
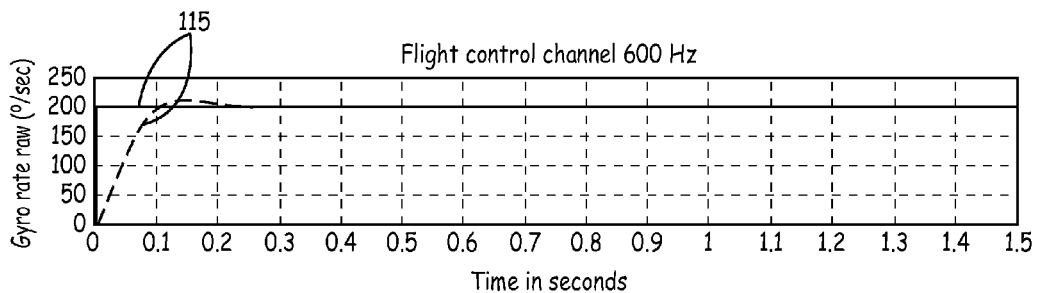
Figure 4B:
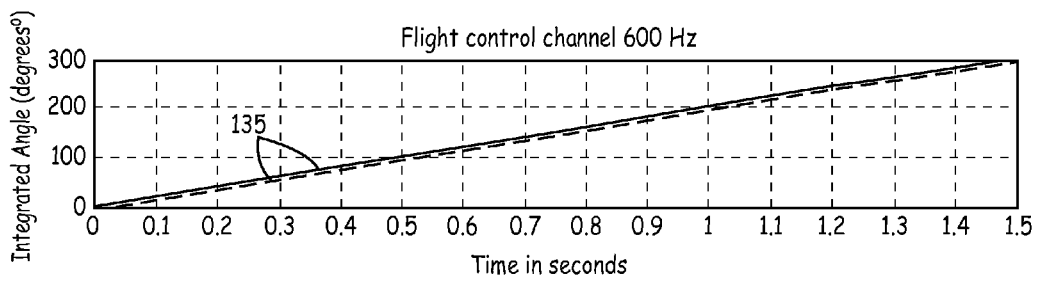
Figure 4C:
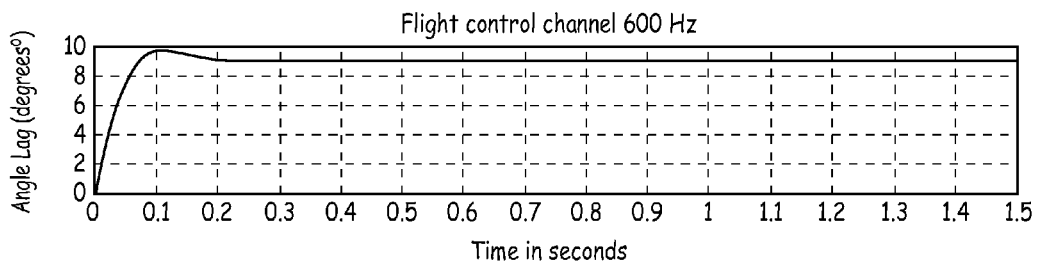
Figure 5A:
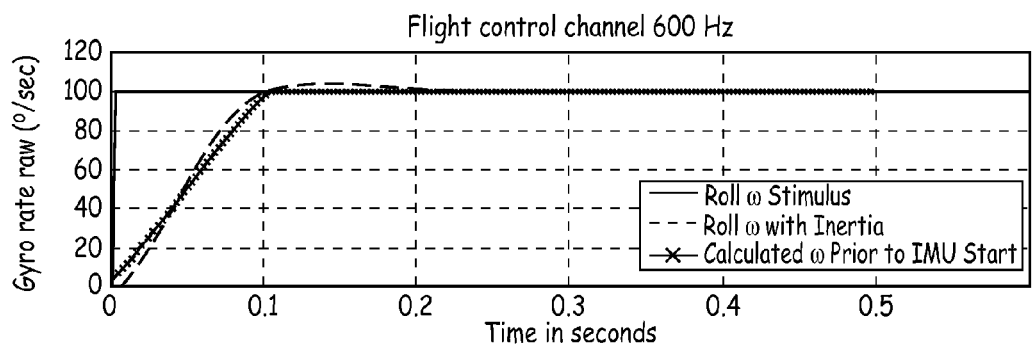

FIGS. 4A, 4B, and 4C are diagrams of example nominal model spin characteristics that account for inertia of an object at release, and a comparison with an ideal response for the object;

FIG. 5A is a diagram depicting an example of a linear fit of data points, a model spin-up characteristic that accounts for inertia, and a stimulus.

Figure 5B:
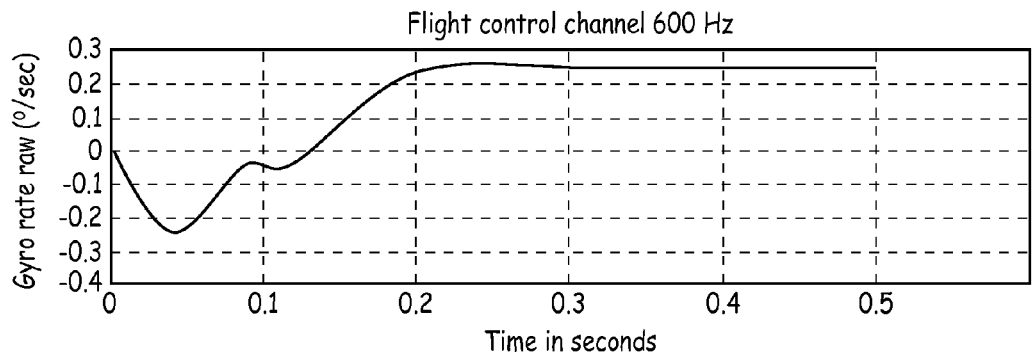

FIG. 5B is a diagram depicting an example of an angular error from the model spin-up characteristic to a rate profile.

In accordance with common practice, the various described figures are not drawn to scale but are drawn to emphasize features relevant to the present invention. Reference characters denote like elements throughout figures and text.

DETAILED DESCRIPTION

In the following descriptions, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical, electrical, and method changes may be made without departing from the scope of the present invention. Therefore, the invention is not limited to the following detailed description. Further, the various sections of this specification are not intended to be read in isolation, but considered together with the teachings of the written description as a whole.

The roll motion of a weapon is typically consistent immediately upon release. Within seconds, however, numerous mechanical and aerodynamic variables begin to take effect. This can make quality determination of the local vertical difficult. In its present state, the rotation experienced by a weapon during the first 100 ms after release is not accounted for, or disregarded, which can affect the accuracy of weapon orientation estimates.

Furthermore, spinning mass gyros are increasingly more difficult to find as the industry migrates to newer technologies, giving rise to more opportunities to replace these older gyros with more modern technology. Inertial Measurement Units (IMUs) provide one possible replacement for the Humphrey spinning mass gyroscopes. IMUs have slower start times than Humphrey gyroscopes, with start times on the order of 300 milliseconds to 600 milliseconds. IMUs can have superior performance in other respects. By combining IMUs with a microprocessor, rotation experienced by an object during startup time can be estimated and accounted for from the start of an object's motion.

The subject matter presented herein provides a system for estimating the initial condition inertial reference frame of an object. This system can enable accurate estimation of an initial condition with the use of an IMU by estimating rotation information for the time period before device startup.

Figure 1:
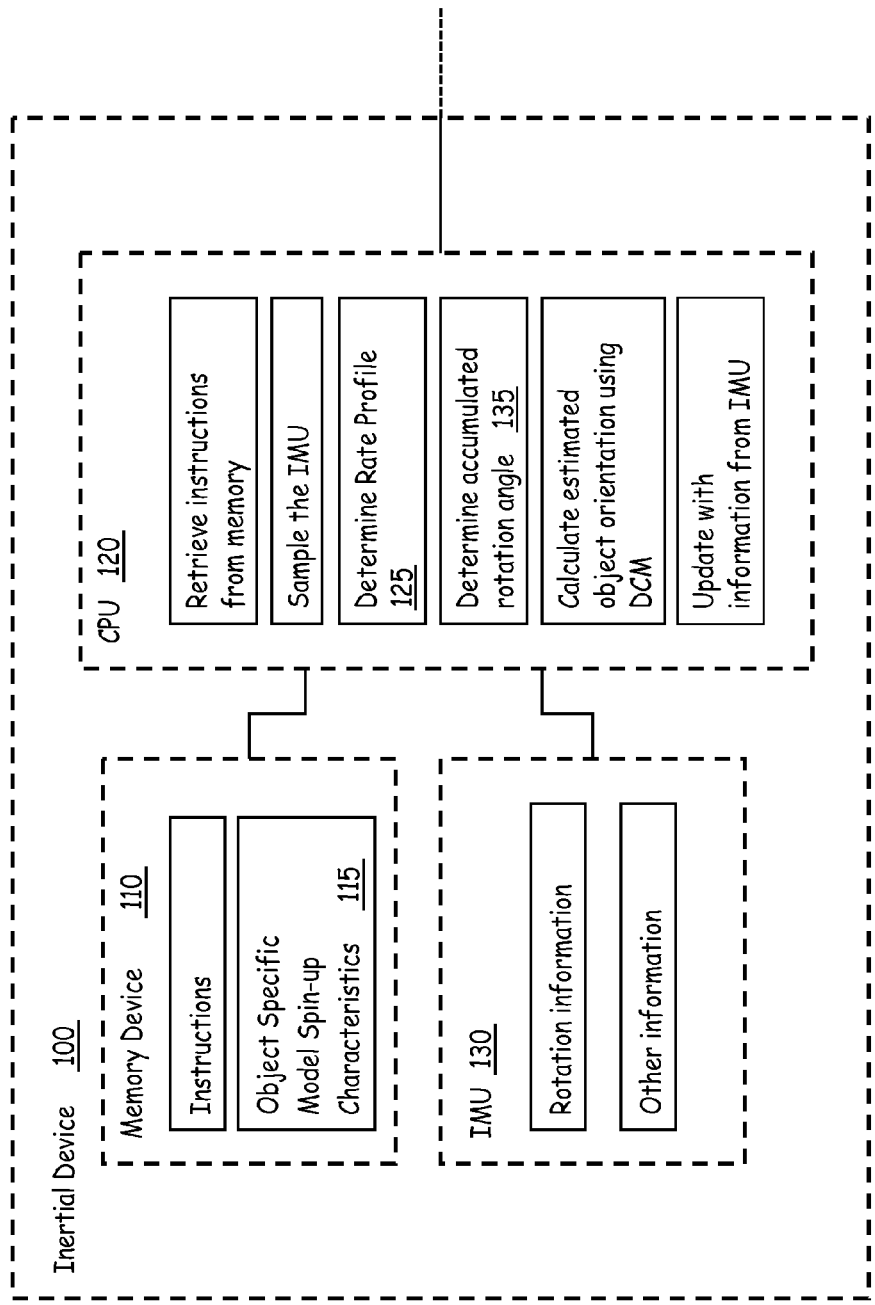
FIG. 1 is a block diagram showing a simplified exemplary embodiment of one configuration of an inertial device.

FIG. 1 is a block diagram of an example inertial device 100 showing the relationship between components of the inertial device 100. The inertial device 100 can include one or more processing devices 120 coupled to one or more memory devices 110. The inertial device 100 can also include one or more inertial measurement units (IMUs) 130 coupled to the one or more processing devices 120. In an example, the inertial device 100 can be associated with an object having a body. The inertial device can be contained within the body of the object. The inertial device 100 can be configured to calculate an initial condition inertial reference frame corresponding to the body, that is, corresponding to the object.

In an example, the inertial device 100 and the one or more processing devices 120 can be "configured" to perform certain acts when the one or more memory devices 110 includes instructions which, when executed by the one or more processing devices 120, cause the one or more processing devices 120 to perform those acts. In an example, the instructions can cause the one or more processing devices 120 to calculate an initial condition inertial reference frame as described herein. These instructions can be stored on any appropriate processor-readable medium used for storage of processor-readable instructions or data structures. This processor-readable media can include the one or more memory devices 110 and/or other suitable media. Suitable processor-readable media can include tangible media such as magnetic or optical media. For example, tangible media can include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EE- PROM), and flash memory, etc. Suitable processor-readable media can also include transmission media such as electrical, electromagnetic, or digital signals, conveyed via a communication medium such as a network and/or a wireless link.

The one or more processing devices 120 can include a central processing unit (CPU), microcontroller, microprocessor, field programmable gate array (FPGA), application specific integrated circuit (ASIC) and other processing devices. The following description may refer to the one or more processing devices 120, the one or more memory devices 110, and the one or more IMUs 130, in the singular form (e.g., the processing device 120); however, it should be understood that the singular form is used for simplicity only, and that use of the singular form is not intended to limit these components to a single component (e.g., a single processing device 120). Accordingly, although the singular form is used, it should be understood that one or more of the particular components can be used as indicated above.

Figure 2:
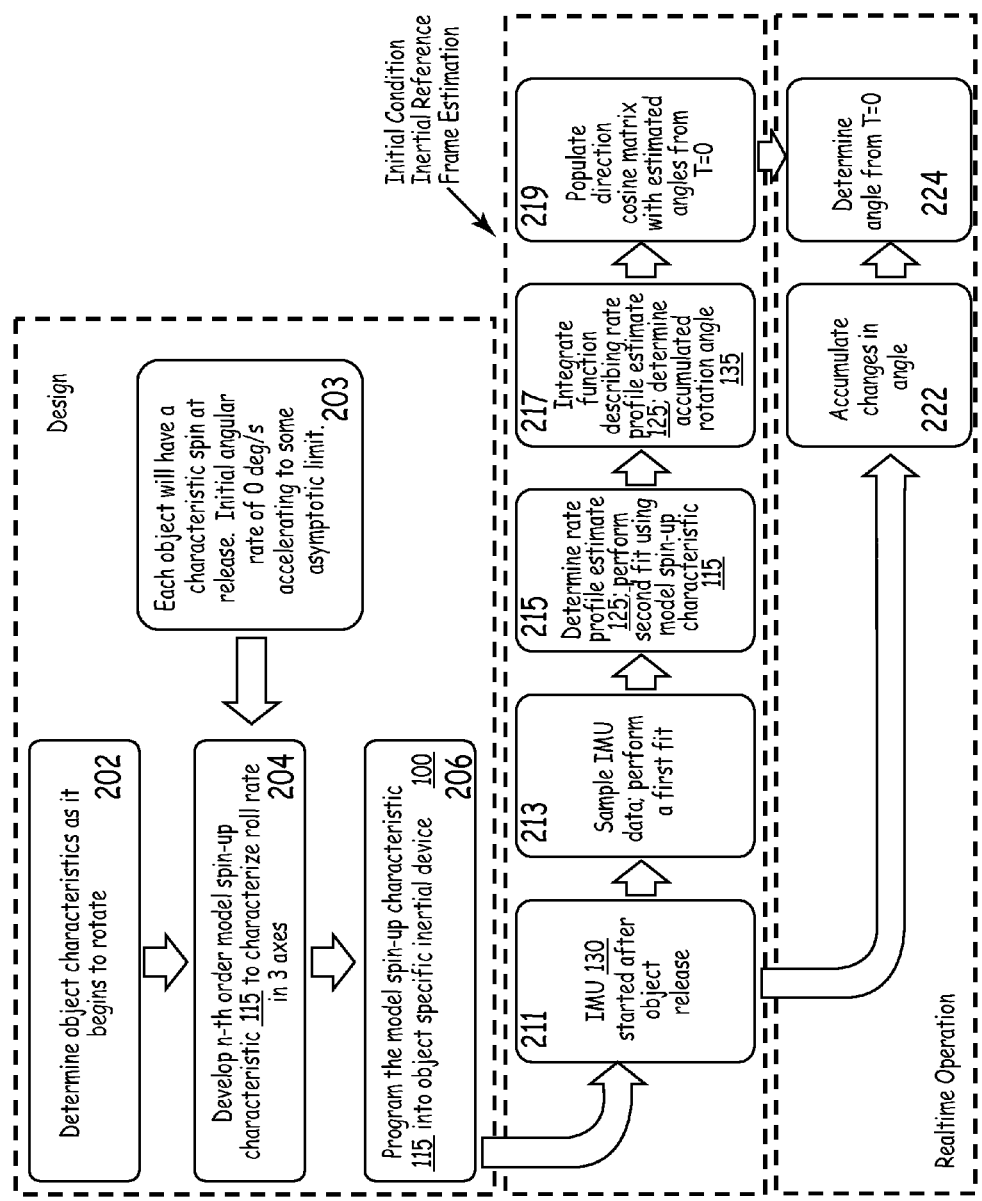
FIG. 2 is a flow diagram depicting a simplified exemplary embodiment of a sequence of acts leading to the operation of the inertial device of FIG. 1.

FIG. 2 is a flow diagram of an example of steps taken in the design and operation of an embodiment of the inertial device 100 in estimating the initial condition inertial reference frame.

In the design stage, at block 202, object motion characteristics are determined. In an example, the object includes a weapon and the motion characteristics include rotation. The characteristics of an object as it begins to rotate are determined, such as how an object rotation accelerates asymptotically up to a maximum limit. In some examples, it is known from weapon specs that once the weapon is released from the aircraft, it starts on a roll motion. Roll motion in the time immediately following weapon release is consistent between weapons of the same size. Thus, models for different weapons for different sizes can be determined.

Then, at block 204, an n-th order model spin-up characteristic 115 can be derived based on these characteristics along all three axes. The n-th order modeling can utilize a first order model (linear), a polynomial, or polynomial accounting for inertia. A model spin-up characteristic 115 is a model that describes an object's rotational rate for a given axis of rotation, in up to three axes—roll, pitch, and yaw, from a first time after the IMU 130 initializes, to a second time before the first time. In one embodiment, the second time occurs before the IMU 130 initializes. In another embodiment, the model describes the object's rotation rate from the beginning of object rotation (T=0) to the time it took for the IMU 130 to initialize.

Block 203 shows initial conditions, like an initial rotational rate of 0 deg/s. In one embodiment, the system assumes that the weapon is stationary at weapon release (T=0), with no angular rate. The weapon will then accelerate asymptotically, up to a maximum rate of rotation. In another embodiment, the body is a body of a weapon, and assumptions are made based on weapon specifications. The system assumes that angular rates at T=0 are effectively zero. The system further assumes that due to the mass of the object and inertial constraints, weapon motion from T=0 until IMU initialization is "well behaved" and can be described as a 1st order acceleration to some nominal roll rate.

At block 206, the model spin-up characteristic 115 can then be programmed into the memory device 110 of the weapon specific inertial device. In one embodiment, the model spin-up characteristic 115 is programmed into system memory 110 of the inertial device 100. The system memory 110 provides the model spin-up characteristic in addition to instructions to the processing device 120 in order to conduct the steps to be described below in initial condition inertial reference frame estimation.

During the initial condition inertial reference frame estimation stage, at block 211, the IMU 130 initializes after weapon release. In operation, a trigger event can cause the inertial device 100 and its components (i.e. the memory device 110, the processing device 120, and the IMU 130) to initialize. For example, the inertial device 100 can initialize when a body (e.g., a munition) is released from another body (e.g., an aircraft, artillery, etc.) This release can be a trigger event causing the inertial device 100 to initialize. During initialization, the inertial device 100 can estimate an initial condition inertial reference frame for the associated body. That is, the inertial device 100 can determine a positional relationship for the body with reference to an external reference frame. In an example, the external reference frame can be the reference frame of the master system, an earth reference frame (e.g., latitude, longitude, altitude), or another reference frame.

Once the IMU 130 initializes, at block 213, rotation rate data from the IMU 130 can be sampled to determine weapon rotation rates. Then, the processing device 120 performs a first fit through the samples. It can be assumed that the start time of a given IMU 130 is well defined, and typically takes between 300 ms-600 ms initialize. Although actual start times of the gyros within an IMU 130 may vary, the time from application of power to IMU start-up is deterministic and can be derived by the processing device 120. IMUs 130 also observe gyro performance and key control mechanisms, and thus establish a time frame where performance is within specified limits. A typical IMU 130 output represents motion and position changes from device startup. An IMU's guidance channel provides data as incremental differences in velocity and angle. An IMU's autopilot channel provides data as linear and angular rates. In one embodiment, the processing device 120 retrieves data from the IMU 130 to perform a first fit using the data from the IMU 120, projected back in time to when the weapon began its motion (T=0). The first fit can be, but is not limited to, a linear or higher order fit.

Next, at block 215, the previously programmed model spin-up characteristic 115 can be applied. A second fit can be performed through the model spin-up characteristic 115 and the first fit. The second fit is an estimated rate profile 125. In one embodiment, the processing device is a CPU 120 that uses the first fit, along with the model spin-up characteristic 115, to establish a rate profile 125 from T=0 to IMU initialization. The CPU 120 does this by applying the model spin-up characteristic to the first fit, and performing a second fit through the first fit and the model spin-up characteristic 115. In another embodiment, the rate profile is a two part, first order fit.

At block 217, a function describing the rate profile 125 can be integrated to determine an accumulated rotation angle 135 from the second time to the first time. In one embodiment, accumulated rotation information 135 is the total rotation angle experienced by the object from T=0 through the time it took for the IMU 130 to initialize.

Once completed, at block 219, this data can be used to populate a rotation matrix to establish the orientation of the weapon from T=0. In one embodiment, the rotation matrix is a direction cosine matrix (DCM). In yet another embodiment, the accumulated rotational angle 135 is used in conjunction with the DCM to calculate an estimated attitude. Angular integration provides the angle though which the weapon has rotated relative to a particular weapon reference frame. Use of a DCM affords the flexibility to then rotate this weapon reference frame to some other arbitrary reference frame.

Meanwhile, during the realtime operation of the IMU, at block 222, the IMU 130 outputs incremental changes in angle experienced by the weapon, simultaneously with the estimation process. The system accumulates changes in angle reported by the IMU from when the IMU initialized. In one embodiment, these steps can occur during post processing for testing purposes.

At block 224, the processing device 120 can then use the incremental changes, and combines it with the accumulated rotational angle 135. Thus, the combined information provides an estimate of the current orientation of the weapon. In one embodiment, this information is used to update the estimated orientation of the object to determine the orientation of the object from T=0. Once the accumulated rotational angle 135 is established, it serves as a fixed offset for further IMU angle computations. For all subsequent data, the IMU 130 will report integrated angle for each axis as a summation of the accumulated rotational angle 135, determined by the process in the previous paragraph, and incremental angle changes, reported in each guidance data message, projected appropriately from body coordinate frame to the local coordinate frame (DCM) established at T=0. The information is then provided for some later use. In one example, the later use might be use by a different device that corrects for deviations in a weapon's path through the air.

Figure 3:
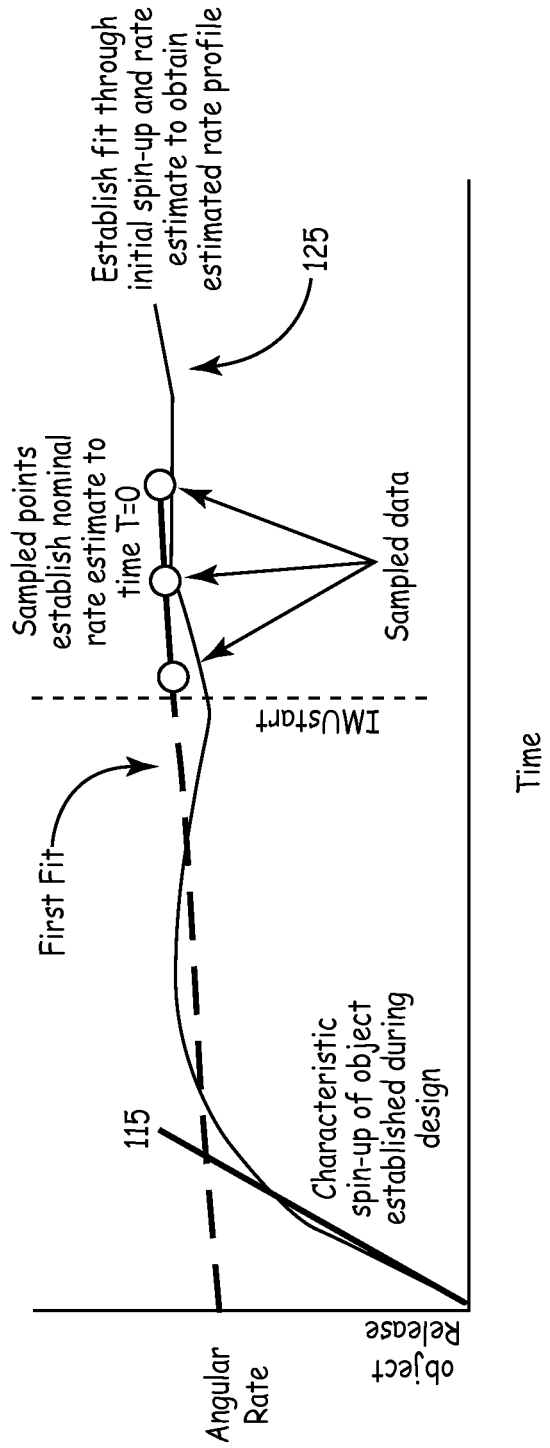
FIG. 3 is a diagram showing an exemplary embodiment of a fit through initial spin-up and estimated rate profile.

FIG. 3 shows an example of an estimated rate profile 125 of an exemplary embodiment. A dashed vertical line denotes where in time the IMU starts. The diagram provides three IMU sample points to the right of the IMU start line. A first fit, a linear regression, is performed on the sample points back to T=0, shown as the dashed line. Then, a linear model spin-up characteristic 115 is applied to the first fit, and a knee is determined at a point where the two intersect. A second fit is performed through the model spin-up characteristic 115 and first fit to obtain an estimated rate profile 125.

FIG. 4A shows an example of a nominal model spin-up characteristic 115 that accounts for inertia and a comparison with an ideal weapon response. The ideal weapon response is depicted as a solid line, whereas the dashed line represents the model that accounts for inertia.

FIG. 4B provides a graph that shows the integrated angle of both models. This is a graphical representation of accumulated rotation angle 135.

FIG. 4C shows the angle lag in the integrated angle, between the ideal weapon response and model response accounting for inertia.

FIG. 5A shows an example rate profile 125 based on 20 IMU samples. The first panel provides a graph displaying an ideal weapon response. The dashed plot line provides a model spin-up characteristic 115. The plot denoted by "x"s provides a first-order fit to the model spin-up characteristic 115. Assuming a nominal start time of 0.5 s, a first order fit was determined to nominally 100 ms. The knee was determined by the model spin-up characteristic 115 for 20 samples at IMU start. Between 0 s and 0.1 s, a linear slope is used.

FIG. 5B shows the angular error between the model spin-up characteristic 115 and the rate profile 125.

What is claimed is:

1. An inertial device for determining an initial condition inertial reference frame for a body, the inertial device comprising:
    at least one inertial measurement unit (IMU) configured to provide rotation information along at least one axis;
    one or more processing devices coupled to the at least one IMU;
    one or more memory devices coupled to the one or more processing devices, wherein the one or more memory devices include instructions which, when executed by the one or more memory devices, cause the one or more processing devices to:
        receive rotation information from the IMU along at least one axis, the rotation information starting at a first time;
        estimate a rate profile for the body from a second time that is prior to the first time, to the first time, based on a model spin-up characteristic for the body corresponding to a time prior to the first time through at least the first time;
        integrate across the rate profile to determine an accumulated rotational angle for the body from the second time to the first time; and
        send an indication of the accumulated rotation angle for later use.

2. The inertial device of claim 1, wherein the instruction to estimate a rate profile includes:
    an n-th order fit to a sampled data, wherein the n-th order fit comprises a first order fit, higher order polynomial fit.

3. The inertial device of claim 1, wherein the model of rotation for the body comprises one of a first order model, a higher order polynomial, or a model that accounts for inertia.

4. The inertial device of claim 1, wherein the body corresponds to a body of a weapon released from an aircraft.

5. The inertial device of claim 1, wherein the IMU provides information along three axes, wherein the three axes comprise roll, pitch, and yaw axes.

6. The inertial device of claim 1, wherein the second time corresponds to a time when the body began its motion.

7. A method of estimating an initial condition inertial reference frame for an object, the method comprising:
    determining a model of rotation for the object, along at least one axis, by one or more processing devices, the model corresponding to a time prior to the first time;
    sampling rotation information from an inertial measurement unit along the at least one axis, the rotation information starting at a first time;
    performing a first fit to the sampled rotation information to a second time, which is prior to the first time;
    applying a model spin-up characteristic that describes body rotational rate for each of the at least one axis from the first time to the second time;
    estimating a rate profile for the object along the at least one axis by performing a second fit through the model spin-up characteristic and first fit;
    integrating across the rate profile to determine an accumulated rotational angle for the body from the second time to the first time along the at least one axis
    populating a rotation matrix with the accumulated rotational angle information and determining object orientation;
    adjusting the accumulated rotation angle with incremental angle changes in each measured axis.

8. The method of claim 7, wherein an n-th order model is a first order model.

9. The method of claim 7, wherein an n-th order model is a polynomial.

10. The method of claim 7, wherein an n-th order model is a polynomial that accounts for inertia.

11. The method of claim 7, wherein the object is a weapon released from an aircraft.

12. The method of claim 7, wherein a first order fit is performed on the sample data.

13. The method of claim 7, wherein a higher order fit is performed on the sample data.

14. The method of claim 7, wherein the second time corresponds to a time when the object began its motion.

15. A non-transitory computer readable medium comprising computer readable code, wherein the code comprises instructions that cause a computer device to:
- receive rotation information from an inertial measurement unit (IMU) along at least one axis, the rotation information starting at a first time;
- estimate a rate profile for a body corresponding to the IMU from a second time that is prior to the first time, to the first time, based on a model spin-up characteristic for the body corresponding to a time prior to the first time through at least the first time;
- integrate across the rate profile to determine an accumulated rotational angle for the body from the second time to the first time; and
- provide the accumulated rotation angle for later use.

16. The computer readable medium of claim 15, wherein the IMU provides rotation information along three axes, wherein the three axes comprise roll, pitch, and yaw axes.

17. The computer readable medium of claim 15, wherein the body corresponds to a body of a weapon released from an aircraft.

18. The computer readable medium of claim 17, wherein the second time corresponds to weapon release.

19. The computer readable medium of claim 15, wherein the model spin-up characteristic is one of a first order model, a higher order polynomial, or a model that accounts for inertia.

20. The computer readable medium of claim 15, wherein the second time corresponds to a time when the body began motion.

* * * * *